United States Patent [19]

Juodikis

[11] 3,946,200
[45] Mar. 23, 1976

[54] PROPORTIONAL TEMPERATURE CONTROLLER

[75] Inventor: Peter Juodikis, Chicago, Ill.

[73] Assignee: GCA Corporation, Bedford, Mass.

[22] Filed: Feb. 24, 1975

[21] Appl. No.: 552,761

[52] U.S. Cl. .................. 219/499; 219/497; 219/501
[51] Int. Cl.² .......................................... H05B 1/02
[58] Field of Search .......... 219/494, 499, 497, 501, 219/504, 505; 323/75 R, 75 B, 75 H

[56] References Cited
UNITED STATES PATENTS

| | | | |
|---|---|---|---|
| 3,452,214 | 6/1969 | Martin | 219/501 X |
| 3,548,155 | 12/1970 | Rabindran | 219/499 X |
| 3,603,768 | 9/1971 | Ireland et al. | 219/499 |

*Primary Examiner*—J. D. Miller
*Assistant Examiner*—Fred E. Bell
*Attorney, Agent, or Firm*—Kenway & Jenney

[57] ABSTRACT

A temperature controller for use with an electrical heater for precisely maintaining the temperature within a system at a selected set point, and employing an improved bridge circuit. A temperature sensitive resistor forms one of the two variable arms of the bridge circuit. The resistor varies in value as a function of temperature exhibiting a temperature coefficient of resistance which is not constant but which varies, decreasing with increasing temperature. The other variable arm, the setting arm, is in the form of a network, including a linear setting resistor and a pair of fixed resistors arranged in a series-shunt circuit. The setting resistor is linearly calibrated in terms of temperature, the series-shunt arrangement providing a composite resistance-set point temperature characteristic which closely corresponds to that of the sensing arm. The temperature controller further includes an operational amplifier which provides an output signal dependent upon the degree of bridge imbalance and a zero voltage switch responsive to the operational amplifier for providing trigger pulses to a triac coupled in the load circuit of the heater. A ramp generator is preferably included as a supplemental input to the zero voltage switch thereby to produce a control system in which the heat released is proportional to the degree the bridge is unbalanced.

12 Claims, 4 Drawing Figures

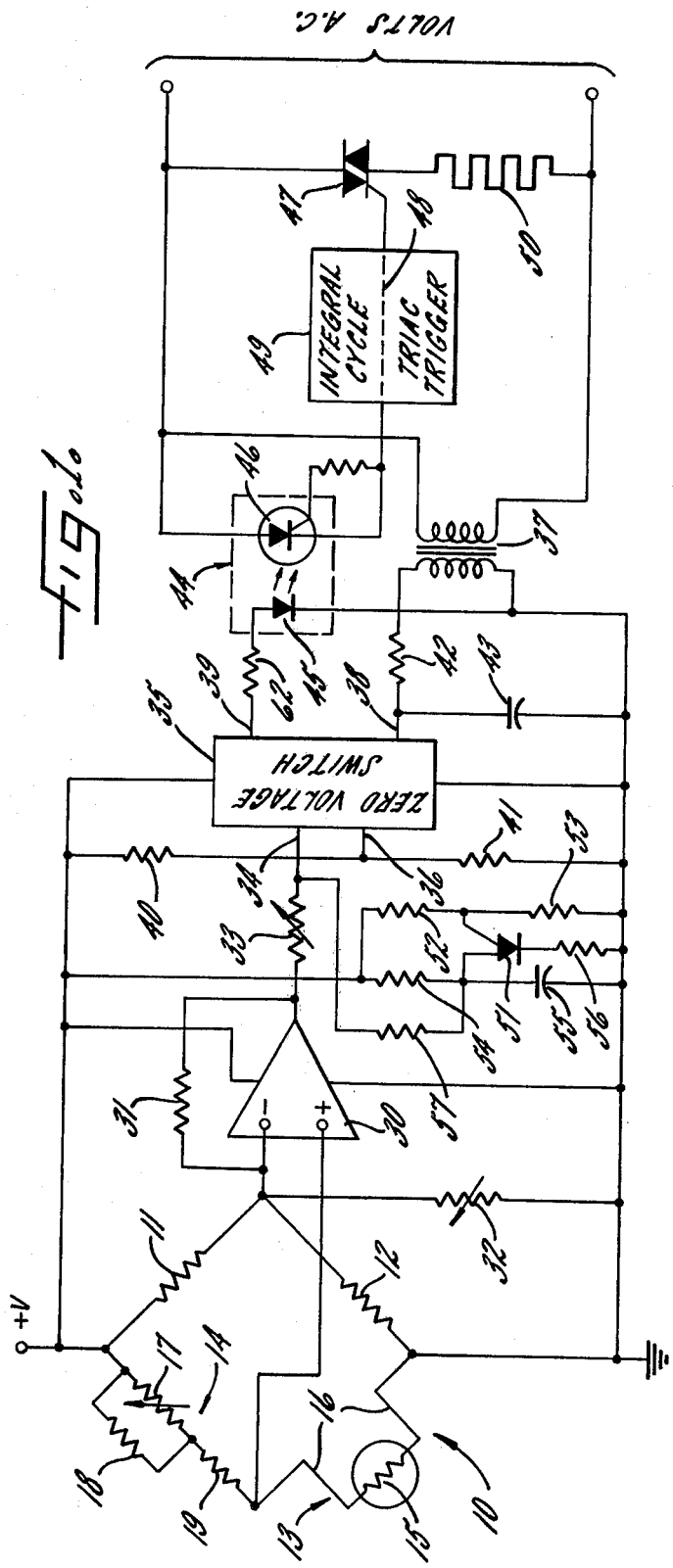
fig. 1.
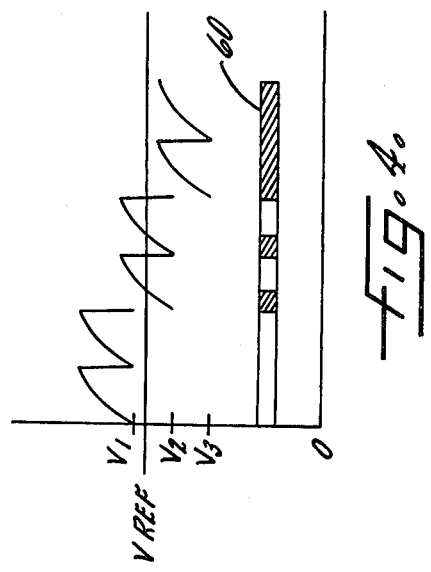
fig. 4.
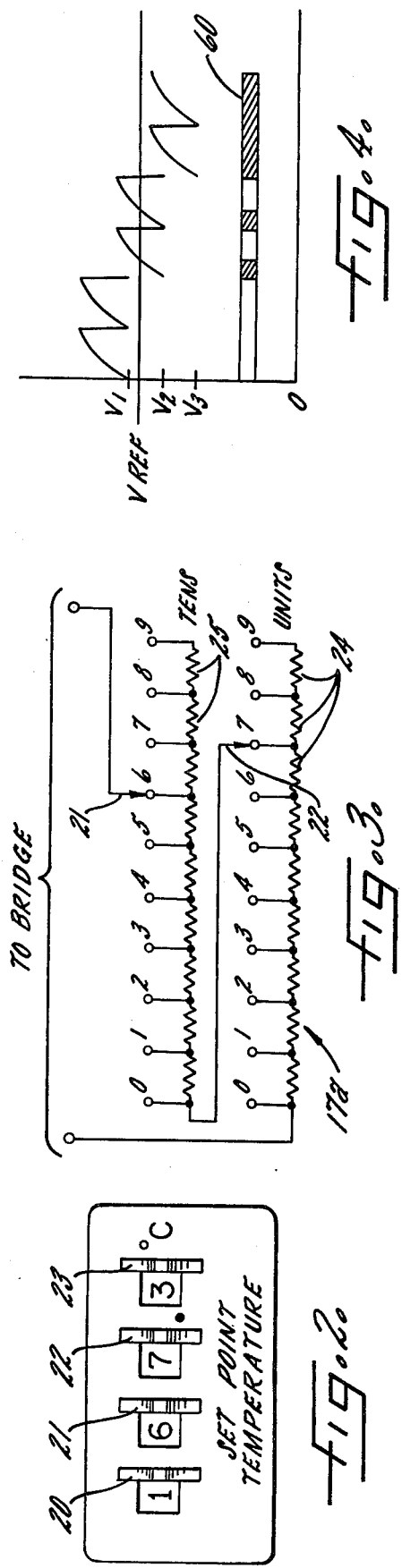
fig. 3.
fig. 2.

PROPORTIONAL TEMPERATURE CONTROLLER

This invention generally relates to temperature controllers, and more specifically to those wherein it is desired to precisely maintain the temperature in a defined area or system at a selected set point, and utilizing a bridge circuit as an input device, the bridge having two variable arms—one related to the measurement of the actual temperature, the other to the selection of the set point temperature.

A temperature sensitive resistor, such as a platinum resistance temperature sensor, finds general application as the sensing element in such a bridge circuit being effectively bucked against an adjustable setting resistor in the opposed arm of the circuit, the bridge being balanced when the resistances of the two arms correspond. A conventionally available platinum sensor, although providing a resistance which accurately and reproduceably responds to the temperature to which it is subjected, possesses a resistance-temperature characteristic which is, unfortunately, non-linear. Because of this, setting resistors in conventional prior art temperature controllers have not permitted calibration directly in terms of temperature, and reference to a calibration chart relating resistance to set point temperature has been necessary. "Linearizing" a bridge has generally required the inclusion in the setting arm of non-linear components, such as a non-linear setting resistor or a non-linear setting indicator. While a linear setting arm might be adequate to approximate the temperature sensor characteristic over a narrow range, the wide range of temperature encountered in a laboratory and the necessity for a high order of accuracy, economically achieved, has called for a special solution.

With the foregoing in mind, it is a general object of the present invention to provide an improved bridge circuit for use with a temperature controller which is accurate, economical, and simple to use. It is a more specific object to provide a bridge circuit which is inexpensive to manufacture, including use of a linearly calibrated variable resistor in the setting arm in which the resistance scale, calibrated in resistance units, is readable, and settable, directly in units of temperature. In this connection, it is an object to provide a bridge which is highly accurate over a wide temperature range but which does not require custom built elements to achieve linearity but which enables use of a linearly tapped "decade" resistor under the control of a bank of display type thumbwheel switches.

It is an object of the present invention to provide a procedure for use in constructing a controller bridge circuit having a non-linear sensing resistor which utilizes a linear setting resistor in a resistor network, which results in a characteristic curve which precisely tracks the curve of the sensing resistor. More specifically, it is an object to provide a bridge wherein the characteristic of the setting arm is caused to exactly coincide with that of the sensing resistor at three widely spaced temperatures and to conform with only minimal error at all other intermediate temperatures.

Other objects and advantages will become apparent from the following detailed description when taken in conjunction with the accompanying drawings, in which:

FIG. 1 is a circuit diagram for a temperature controller utilizing the teachings of the present invention;

FIG. 2 is an illustrative set point control panel for use with the circuit of FIG. 1;

FIG. 3 is a circuit diagram of a portion of a tapped resistor for use with the set point control panel of FIG. 2; and FIG. 4 is a diagram illustrating waveforms in the circuit of FIG. 1 when used as a proportional controller.

While the invention will be described in connection with certain preferred embodiments, it will be understood that there is no intention to limit it to those embodiments. On the contrary, the intent is to cover all alternatives, modifications and equivalents as may be included within the spirit and scope of the invention as defined by the appended claims.

Turning now to the drawings, and particularly to FIG. 1, attention will initially be focused upon the bridge circuit, and the novel means for achieving linearization thereof. A Wheatstone bridge, generally indicated at 10, has a suitable supply of DC voltage coupled across two opposite terminals. The remaining two terminals, which thereby carry the bridge output, are coupled, in the illustrated embodiment, to the inputs of operational amplifier 30. Two adjacent arms of the bridge are comprised of fixed resistors 11, 12 whose ratio, in a manner well known in the art, determines a bridge constant N for balancing the bridge. The two remaining arms, the sensing arm 13 and the setting arm 14 will cause the bridge to balance when their resistances are in the same ratio N. For example, if N is selected as 1, the resistances of the setting and sensing arms must be equal for bridge balance. The term "proportionately" is used herein to indicate the correspondence between the setting and sensing arm resistances as adjusted by such constant.

The sensing arm 13 includes temperature sensitive resistor 15 which is connected to the bridge circuit by leads 16, intended to illustrate the remote location of such resistor, i.e., within the area whose temperature is to be controlled. It should therefore be understood that the temperature sensitive resistor is subjected to the conditions within the controlled area or system, and accordingly its resistance varies as a function of actual temperature.

Temperature sensitive resistor 15 is of the class of sensors of which a platinum resistance element is a common example, having a positive temperature coefficient which decreases with increasing temperature resulting in inherent non-linearity over wide temperature swings. The resistance-temperature characteristic of this class of sensors may be described by the following generalized expression:

$$R(T) = R_0 (1 + AT + BT^2)$$

where $R$ is the resistance of the element as a function of temperature $T$, $R_0$ is the resistance of the element at 0°C., $A$ is a constant greater than 0, and $B$ is a constant less than 0.

For the example of a platinum resistance element, the constants assume the following values:

$R_0 = 100$ ohms $A = 3.9078 \times 10^{-3}$ $B = -0.578 \times 10^{-6}$

It will be understood from the foregoing that at low temperatures the relationship is reasonably linear and that non-linearity becomes a problem because of progressing reduction in temperature coefficient at relatively higher temperatures.

The remaining arm of the bridge, the setting arm 14, is made up of a resistance network, which, when the bridge is balanced by the resistance of the sensing arm 13, assures that the actual and set point temperatures agree. In accordance with the invention, the setting arm network is comprised of only fixed or linear compounds arranged to provide a composite resistance whose characteristic closely corresponds to that of the sensing arm. This is achieved by providing a linearly variable setting resistor 17 having an adjustment means which may be linearly calibrated in units of temperature. The requisite non-linearity is achieved by shunting the adjustable resistor 17 with a resistor 18 whose value is selected, as will be described below, to introduce a curvature to the resistance-set point temperature characteristic, the degree of curvature increasing with increasing set point temperature. In addition, a series resistor 19 is provided, having a value selected to correspond to the resistance of the sensing resistor at a minimum temperature, as adjusted by the bridge constant. The value of resistor 19 may, for example, be chosen as $NR_0$ if the minimum temperature for operation of the controller is 0°C.

The following analysis is offered to develop the relationships necessary to practice the invention:

As set forth above, the resistance temperature sensor is characterized by the expression $$R(T_a) = R_0 (1 + AT_a + BT_a^2) \tag{1}$$

where $T_a$ is used to indicate the actual or sensed temperature. Initially, assume that the bridge circuit will operate at any temperature $T$ between temperatures $T_{min.}$ and $T_{max.}$. The resistance of the temperature sensor at temperature $T_{min.}$ is $$R_{min.} = R_0 (1 + AT_{min.} + BT^2_{min.}) \tag{2}$$

Let us next define a new variable $M(T)$ which is equal to the resistance of the temperature sensor at any temperature $T_a$ less the resistance of the sensor at temperature $T_{min.}$. In other words, $M(T)$ defines the resistance change of the sensor from minimum temperature to any actual temperature. Thus $$M(T) = R_0 [A (T_a - T_{min.}) + B(T_a^2 - T^2_{min.})] \tag{3}$$

For convenience, a new variable $X$ is introduced, defined as $$X = \frac{T_a - T_{min.}}{T_{max.} - T_{min.}} \tag{4}$$

It will become apparent that $X$ is not only related to the temperature of the sensing resistor $T_a$, but, due to the linear correspondence between set point temperature and the resistance of the setting resistor, is also related to set point temperature $T_{sp}$. It should be further realized that, within the range of $T_{min.}$ to $T_{max.}$, $X$ may vary between 0 and 1. Rearranging equation (4) yields $$T_a - T_{min.} = (T_{max.} - T_{min.}) X \tag{5}$$

Substituting this relationship into equation (3) yields $$M(X) = R_0 [A(T_{max.} - T_{min.}) X + B(T^{2d\ max.} - T^2_{min.})X^2 - 2B(T^2_{min.} - T_{max.}T_{min.})X] \tag{6}$$

Normalizing the expression for $M(X)$ by dividing the generalized expression by $M_{max.} - M_{min.}$ yields a normalized expression for the sensing element resistance as a function of $X$, hereinafter $r_D(X)$. This expression becomes $$r_D(X) = \frac{AX + B(T_{max.} - T_{min.}) X^2 + 2BT_{min.} X}{A + B(T_{max.} - T_{min.}) + 2BT_{min.}} \tag{7}$$

Having thus developed an expression for the resistance of the sensing element as a function of $X$, attention may now be directed toward the setting arm. The set point resistor, whose resistance is linearly variable between zero and $R_1$, is included in the setting arm for selecting the set point temperature. The indicating means associated with the setting resistor is linearly graduated, for example, in degrees centigrade. In addition, the series resistor is selected to balance the bridge at $T_{min.}$, in other words being equal to $NR_{min.}$. In light of the foregoing, it should be appreciated that the variable $X$, defined above in terms of temperature, may also be related to the selected value of adjustable resistor $R_1$. More specifically, for any set point temperature $T_{sp}$, the resistance of the adjustable resistor will be equal to $XR_1$. A factor $K$ will be defined to relate the value of the shunt resistor to the value of the adjustable resistor. The value of the shunt resistor is selected to be $KR_1$, the $K$ factor to be defined below. An equivalent resistance of the shunt circuit as a function of $X$ is seen to be the parallel combination of $KR_1$ with $XR_1$. Stated mathematically $$R_{eq}(X) = \frac{(KR_1)(R_1X)}{KR_1 + R_1X} = \frac{KR_1X}{K + X} \tag{8}$$

Normalizing this expression for the equivalent resistance of the shunt circuit by dividing the generalized expression by $R_{eq\ max.} - R_{eq\ min.}$ yields a normalized expression for the equivalent resistance of the shunt circuit as a function of $X$, hereinafter $r_{SP}(X)$:

$$r_{SP}(X) = \frac{(K+1) X}{K + X} \tag{9}$$

Comparing the expression for the normalized value of the sensing resistor as a function of $X$ with the normalized value for the setting resistor as a function of $X$ discloses several important factors. Initially, it is seen that the two functions are equal when $X = 0$ and when $X = 1$, in other words at $T_{min.}$ and $T_{max.}$. This demonstrates that the characteristics of the sensing and setting resistors exactly correspond at the minimum and maximum design temperatures. In addition, as both functions are non-linear, a third point of coincidence may be selected. This is accomplished by selecting a value of $X$ between 0 and 1 and equating the normalized set point and sensing element resistances for this value of $X$. The result will be a value for the factor $K$ which will cause the characteristic of the composite setting arm to correspond to that of the sensing arm at the temperature corresponding to $X_C$. Performing the operation yields $$K = -X_c - \frac{A + B(T_{max.} - T_{min.}) + 2BT_{min.}}{B(T_{max.} - T_{min.})} \qquad (10)$$

In summary, using the procedures taught above, a group of fixed or linear components may be combined in the setting arm of a bridge, and their values selected so that the characteristic of the setting arm is caused to accurately match the non-linear characteristic of a platinum resistance temperature sensor or the like. More specifically, the values of the various resistors are chosen so that the curves correspond exactly at three selected temperatures. Stated mathematically, $$NR_o(1+AT_a+BT_a^2) = R_{series} + \frac{KX}{K+X} R_1 \qquad (11)$$

at temperatures $T_{min.}$, $T_{max.}$, and $T_c$. In addition, as the influence of the shunt resistor becomes more pronounced with increasing set point temperature, the characteristic of the setting arm may be described as one whose resistance varies as a function of temperature, with the rate of variation decreasing with increasing temperature. It is recalled that this also describes the characteristic of the temperature sensing element. As an example of the ability of the composite setting arm to track the non-linear sensing arm, a bridge has been designed for use with a platinum resistance temperature sensor, and for operation between 0° and 400°C., with a resolution of 0.1°C., wherein the maximum deviation between set point and actual temperature at bridge balance is ±0.075°C.

As a further feature of the present invention, the selecting of a set point temperature may be further simplified by providing an adjustable resistor 17 in the form of a tapped resistor controlled by a series of display type thumbwheel switches. FIG. 2 shows an exemplary control panel, including a series of four thumbwheel switches, for adjusting such a tapped resistor arrangement. The exemplary control panel includes four thumbwheel switches 20–23 for setting the hundreds, tens, units, and tenths digits respectively. The associated indicators digitally display the selected temperature in degrees centigrade, for example the 167.3°C. setting illustrated. A portion of the tapped resistor for use with such a control panel is illustrated in FIG. 3. Two tapped resistors, corresponding to the tens and units digits, and forming a portion of adjustable resistor 17 are illustrated along with selectors 21 and 22. The units column includes nine resistors 24, and the tens column nine resistors 25. It should be appreciated that all resistors 24 are identical in value and all resistors 25 are identical in value and weighted with respect to resistors 24. More specifically, the value of each resistor 25 should be 10 times the value of each resistor 24 to account for the digit weighting. For example, if the bridge were designed with the value of the adjustable resistor chosen such that 1 ohm of resistance corresponds to 1°C. of temperature, then resistors 24 would each be of 1 ohm and resistors 25 would each be of 10 ohms. The position of the selectors 21 and 22 in FIG. 3 corresponds to their settings in FIG. 2. It is seen that in this position there are six resistors 25 in series with seven resistors 24, the entire series circuit being connected to the bridge at the terminals of resistor 17. In the example given above, this would correspond to a resistance of 67 ohms, which in turn would correspond to a set point temperature of 67°C. While a tapped resistor corresponding to the entire four digits of FIG. 2 has not been illustrated, it is believed that the pattern demonstrated above makes obvious the inclusion in a series circuit of further weighted resistors corresponding to the entire four digits of FIG. 2. In addition, if $T_{max.}$ is chosen, for example, at 199.9°C., the tapped resistor corresponding to thumbwheel 20 need only have one resistor and a two position tap, the resistor weighted at 10 times the value of resistors 25, or in the example 100 ohms.

Referring again to FIG. 1, a temperature controller adapted to function with the aforementioned bridge circuit will be described.

Connected to the bridge output terminals is an operational amplifier 30 which forms a buffer between the bridge and the remaining circuitry. It converts any current imbalance in the bridge to a proportional voltage output. This is accomplished, in a known manner, using feedback resistor 31 coupled between the amplifier output and its inverting input. More specifically, the operational amplifier generates an output voltage which causes a current flow through resistor 31 to maintain the inverting input of the amplifier at the same voltage as the non-inverting input. Any imbalance in the bridge caused by a proportional difference between the resistances of the setting and sensing arms will be reflected as a change in voltage at the non-inverting input of amplifier 31. This change in voltage will cause the output of the operational amplifier to correspondingly change such that the current flow through resistor 31 is increased or decreased, depending upon the direction of change, to bring the inverting input to the same voltage as the non-inverting input.

In the configuration illustrated in FIG. 1, it is noted that the temperature controller is operated with only a single supply of DC voltage. For that reason, it becomes desirable to bias the operational amplifier such that, for the condition defined as "bridge balance," the output of the amplifier is slightly positive. This can be accomplished, for example, by the addition of variable resistor 32 coupled between the inverting input of the amplifier and circuit common. This resistor forms a secondary path for current flow at the inverting summing junction causing the output of the amplifier to rise slightly to supply the additional current. It is realized that, in fact, resistor 32 causes a deliberate imbalance of the bridge; however, this condition, when used in the illustrative embodiment of FIG. 1, may be defined as bridge balance for the temperature controller.

The bridge-operational amplifier combination operates in the following manner. When the set point and actual temperatures are equal, the condition described above as bridge balance, the output of the amplifier is slightly positive. This condition will be interpreted by circuitry, to be described below, to prevent the addition of heat to the system. If the actual temperature falls below the set point, the resistance of the temperature sensing element decreases becoming proportionately less than the setting arm resistance. The bridge imbalance thus created causes the voltage at the amplifier non-inverting input to decrease. The resulting decrease in the output voltage of the amplifier causes a reduction in the current flow through resistors 31 and 12, decreasing the voltage dropped across resistor 12 thus bringing the inverting and non-inverting inputs to the same voltage level. The decrease in the operational amplifier output voltage will be interpreted by the remaining circuitry to cause the addition of heat to the system. The temperature will rise causing the resistance of the sensing element to increase, raising the output voltage of the amplifier until bridge balance is again achieved. It should be apparent that a bridge imbalance resulting from a setting arm resistance which is proportionately less than the sensing arm resistance (indicating that the actual temperature is greater than the set point temperature) causes the amplifier output to further increase thereby preventing the addition of heat to the system.

The output of the operational amplifier is coupled through adjustable resistor 33 to input 34 of a zero voltage switch 35. Various means for zero voltage switching are known to the art, the object being the generation of a trigger pulse at each zero crossing of an AC wave. The particular switch illustrated is an integrated circuit commercially available from RCA and carrying RCA identification No. CA3059. Terminals 34 and 36 form opposed inputs to a differential amplifier which enables the circuit for generating a brief positive pulse at each zero crossing of an AC input wave, when input 34 is at a lower voltage than input 36. No output pulses are generated when input 34 is at a higher voltage than input 36. The AC input wave is provided via transformer 37 to terminal 38 of the zero voltage switch. The output pulses, which appear at terminal 39, are ultimately used to drive an output thyristor.

It should be understood therefore that when terminal 34 is positive with respect to terminal 36, the zero voltage switch maintains its output terminal 39 at a low level. However, when terminal 34 becomes more negative than terminal 36, a zero crossing detector within the zero voltage switch, which samples the AC wave on terminal 38, generates a brief positive pulse at each zero crossing of such wave, the pulse appearing at terminal 39. For biasing the zero voltage switch, resistors 40 and 41 are coupled in series across the DC supply. Their common terminal is coupled to terminal 36 of the zero voltage switch, thereby setting a reference level for comparison with the voltage level on terminal 34. If desired, resistor 42 may be coupled between the secondary of transformer 37 and terminal 38 of the zero voltage switch, and capacitor 43 may be coupled from terminal 38 of the zero voltage switch to circuit common. These components introduce a slight phase shift in the AC input signal thereby affording the capability to compensate for any phase shift in the controller, such as that which might be introduced by transformer 37.

To sum up thus far, what has been described is a bridge circuit which continually compares an actual temperature with a set point temperature and, acting through an operational amplifier, produces a voltage whose level is responsive to the difference between the actual and set point temperatures. When the output of the operational amplifier, which is coupled to one of the inputs of a zero voltage switch, decreases below a predetermined reference level, the zero voltage switch will emit a brief positive pulse at every zero crossing of the AC wave sampled through transformer 37.

Neglecting for the moment the additional components in the input circuit to the zero voltage switch, which will be described below with reference to proportional control, the operation of the circuit as an on-off control will be described. The output of the circuitry described thus far is coupled to an electrically isolated circuit by photocoupled SCR 44. That circuit is comprised of a light emitting diode 45 which is optically coupled to a photosensitive SCR 46. The operation is such that when a positive pulse is emitted by zero voltage switch 35, current flows through resistor 62 and light emitting diode 45. This causes light emitting diode 45 to radiate, the radiation being imposed on photosensitive SCR 46. The photosensitive SCR is thereby driven into conduction when the signal on its anode exceeds that on its cathode. Recalling that the positive pulses are emitted at zero crossings, or in other words at the initiation of each half wave of AC voltage, it should be appreciated that SCR conduction will be initiated at the start of every positive half cycle. It should be further understood that due to the unidirectional nature of the current flow through SCR 46, no condition will occur during the negative half cycle.

The output of the SCR is coupled to an integral cycle triac trigger 49. This circuit may be implemented by various means known to the art, for example, by a circuit illustrated as FIG. 17 of RCA publication ICAN-6158. The purpose of this integral cycle triac trigger is to trigger triac 47 for conduction, and also to assure that the triac will conduct only full waves of AC current. In other words, the triac is triggered directly by the initiating pulse through SCR 46 on the positive half cycle; the integral cycle triac trigger then assures that the triac will be triggered on the succeeding negative half cycle. This operation is advantageous in relatively high current temperature controllers wherein, if integral cycle triggering were not assured, an appreciable DC component would be introduced into the power transformer supplying the AC voltage, possibly causing overheating of such transformer. However, if such overheating is not a major concern, integral cycle triac trigger 49 may be eliminated as indicated by alternative connection 48, directly coupling the output of SCR 44 to the gate of the triac 47. However, as will be apparent to one skilled in the art, if the integral cycle triac trigger is eliminated, a bidirectional coupling device should be substituted for photocoupled SCR 44. Various means for accomplishing this are well known, for example certain of the circuits illustrated in the aforementioned RCA publication, and also the simple reed relay device.

The load circuit of triac 47 is coupled in series with a heater element 50, the series combination being coupled across the AC line. It is therefore seen that whenever the triac is caused to conduct, current will be supplied to the heater, thereby increasing the temperature in the controlled area or system. It is further noted that the primary of transformer 37 is coupled to the heater supply, thereby allowing the zero voltage switch to assure triac gating at zero crossings. This is important in temperature controllers used, for example, in scientific areas where the generation of transients would be undesirable due to their effect on nearby equipment. It is well known that minimum transients are generated when a triac or other thyristor device is triggered when the voltage across it is at or near a zero level. This, coupled with the fact that the triac is a latching device which will only turn off when the current through it falls to zero, avoids the generation of unwanted transients.

In summary, the circuit thus far described is seen to trigger the triac for supplying current to the load whenever the voltage on terminal 34 of the zero voltage switch decreases below the reference level on terminal 36. It is further recalled that this occurs whenever the resistance of the setting arm proportionately exceeds that of the sensing arm, in other words, when the temperature in the controlled system is below the set point temperature. The on-off control thus described, however, produces a certain amount of hunting about the set point temperature; such hunting may be undesirable in certain applications and may be minimized by circuitry to be described below. The temperature controller of FIG. 1 provides means for achieving a proportional control wherein the amount of power supplied to the heater is a function of the difference between the set point and sensed temperatures. This is accomplished by producing a ramp voltage and combining such ramp voltage with the output signal of the operational amplifier.

The ramp generator comprises a programmable unijunction transistor (PUT) 51 and its environmental components. Resistors 52 and 53 are coupled in series across the DC power supply, with their common terminal coupled to the gate of PUT 51. Similarly, resistor 54 and capacitor 55 are coupled in series across the DC supply having their common terminal connected to the anode of PUT 51. Resistor 56 is conducted between the PUT cathode and ground for purposes of current limiting. Resistors 52 and 53 form a voltage divider for setting a reference level at the gate of the PUT. Resistor 54 provides a path for charging capacitor 55. In a well known manner, when the voltage on capacitor 55 exceeds the voltage at the gate of the PUT, the PUT will conduct current from anode to cathode. This action rapidly discharges the capacitor, which in turn causes the PUT to resume its non-conducting mode. It should therefore be appreciated that the voltage present at the junction of resistor 54 and capacitor 55 is a ramp function, characterized by a relatively slow capacitor charge and a rapid discharge. This voltage is coupled through resistor 57 to terminal 34 of the zero voltage swtich 35. In this way, the ramp voltage generated by the PUT 51 is combined with the output signal of operational amplifier 30.

Such voltage combination provides the proportional control which may be illustrated with reference to FIG. 4, which is a plot of voltage versus time for the zero voltage switch inputs 34 and 36. The horizontal line $V_{ref}$ is the constant voltage present at terminal 36 by virtue of the voltage divider action of resistors 40 and 41. The voltage levels $V_1$, $V_2$ and $V_3$ represent three different output levels from operational amplifier 30. It is seen that added to each of the levels is a ramp signal which is generated by PUT 51. Bar graph 60 is included on the chart to illustrate the reaction of the heater, the crosshatched portions of the bar graph indicating power being supplied to the heater. With the operational amplifier output at $V_1$ volts, the heater remains deenergized, as that voltage level with the addition of the ramp signal always remains higher than the reference voltage. It is recalled that this condition prevents the zero voltage switch from generating pulses at the zero crossing of the AC wave. When the operational amplifier output is at $V_3$ volts or below, it is seen that the heater is continuously supplied with power. This is because the output signal has decreased to a point where, even with the addition of the ramp signal, the combined signal does not exceed the reference voltage. Therefore it should be appreciated that the zero voltage switch continues to emit a trigger pulse at every zero crossing, which, in combination with the integral cycle triac trigger, maintains the triac in conduction. An intermediate level of output voltage is illustrated at $V_2$. It is seen that the voltage level is initially below the reference voltage causing the zero voltage switch to generate trigger pulses which ultimately supply power to the heater. However, the addition of the ramp voltage to the output voltage causes the combined voltage to exceed the reference voltage at some point. On this occurrence, the zero voltage switch will cease generating trigger pulses, removing the gate signal from the triac and thereby interrupting the supply of power to the heater. When the PUT conducts to discharge the capacitor, the voltage again falls to the $V_2$ reference level, again initiating the supply of power to the heater. It should therefore be appreciated that, utilizing the proportional control, full power is supplied to the heater at initial turn-on when there is a large difference between the set point and sensed temperatures. However, as the actual temperature approaches the set point temperature, the output signal of the operational amplifier approaches the reference voltage. As the voltages converge, the addition of the ramp voltage will cause the combined voltage to begin to exceed the reference voltage. Thus, during a portion of each of the ramp cycles, the supply of power to the heater will be interrupted. This period of interruption will increase as temperature continues to rise, ultimately causing the actual and set point temperatures to converge without considerable overshoot.

As previously noted, adjustable resistor 33 is interposed between the output of the operational amplifer and terminal 34 of the zero voltage switch. This resistor, which may be termed the bandwidth resistor, is utilized to set the proportional control. Bandwidth may be defined as the required temperature change, as sensed by the sensing arm, which causes the heat output to change between 0 and 100%, when the set point is held constant. Referring again to FIG. 4, it is seen that a change in output signal from the operational amplifier from $V_1$ to $V_3$ results in such a 0 to 100% change in heat output. In a practical temperature controller, a bandwidth adjustment has been provided which varies the bandwidth between a minimum of 0.25°C. and a maximum of 2.0°C.

Worthy of note, is the fact that the period of the ramp signal should be relatively long with respect to the period of the power supply, but relatively short when compared to the thermal time constant of the system. The PUT ramp generator provides a convenient means for regulating such a ramp signal. More specifically, the values of resistors 54 and capacitor 55 may be adjusted or selected to achieve the required rate of charge. In addition, the values of resistors 52 and 53, which set the "program point" for the PUT, the voltage at which the PUT will conduct, may be used to adjust both the time period and the maximum value of the ramp signal.

Thus it is apparent that there has been provided, in accordance with the invention, a bridge circuit and a temperature controller for use therewith which fully satisfy the objects, aims and advantages set forth above. While the invention has been described in conjunction with a specific embodiment thereof, it is evident that many alternatives, modifications and variations will be apparent to those skilled in the art, in light of the foregoing description. Accordingly, it is intended to embrace all such alternatives, modifications and variations as fall within the spirit and scope of the appended claims.

I claim:

1. A temperature controller for a controlled space comprising in combination, a bridge having four resistive arms defining pairs of input and output terminals, the first and second arms having first and second resistors having a predetermined ratio, the third arm having a temperature sensitive resistor with a temperature coefficient of resistance which gradually varies with increasing temperature to produce inherently non-linear response, the fourth arm including an adjustable setting resistor, a fixed shunt resistor in parallel with the setting resistor, a fixed series resistor interposed in series with the paralleled setting resistor and shunt resistor, the adjustable setting resistor being in the form of a linearly tapped decade resistor in which the taps are settable by a bank of display type thumbwheel switches providing a display of set resistance directly in units of temperature, the values of the fixed shunt and series resistors being so chosen that the variation of the setting resistor produces a non-linear variation in the resistance of the setting arm which tracks, and thus compensates for, the non-linear response of the temperature sensitive resistor so that the bridge is balanced at a sensed temperature which corresponds to the temperature displayed on the thumbwheel switches, a source of heat in the space, and control circuitry connected to the output terminals of the bridge and responsive to a condition of unbalance of the bridge for correctively energizing the source of heat for maintenance of the temperature at the set value.

2. The combination as claimed in claim 1 further including an operational amplifier having its input terminals coupled to the bridge output terminals for producing a voltage dependent upon the degree of bridge imbalance, means for generating a ramp voltage, means for generating a reference voltage, means for combining the amplifier output voltage, the ramp voltage, and the reference voltage to provide a control signal in which the ON time is proportioned in accordance with the bridge output, a heating element, a solid state switch connected in series with the heating element for turning on and off a flow of current thereto, and means for coupling the control signal to the solid state switch for corrective energization of the heating element so that the temperature is maintained at the value set on the thumbwheel switches.

3. The combination as claimed in claim 1 wherein the values of the shunt and series resistors are so chosen that the bridge is balanced at three widely spaced temperatures within a temperature range.

4. The combination as claimed in claim 3 wherein the value of the series resistor is chosen so that the bridge is balanced at a minimum temperature, and the value of the shunt resistor is chosen so that the bridge is balanced at a maximum temperature and at an intermediate temperature.

5. A temperature controller for a controlled space comprising in combination, a bridge having four resistive arms defining pairs of input and output terminals, the first and second arms having first and second resistors having a predetermined ratio, the third arm having a temperature sensitive resistor with a temperature coefficient of resistance which gradually varies with increasing temperature to produce inherently non-linear response, the fourth arm including an adjustable setting resistor, a fixed shunt resistor in parallel with the setting resistor, a fixed series resistor interposed in series with the paralleled setting resistor and shunt resistor, the adjustable setting resistor being in the form of a linearly tapped decade resistor, means for setting the taps of the decade resistor and for directly displaying the selected temperature, the values of the fixed shunt and series resistors being so chosen that the variation of the setting resistor produces a non-linear variation in the resistance of the setting arm which tracks, and thus compensates for, the non-linear response of the temperature sensitive resistor so that the bridge is balanced at a sensed temperature which corresponds to the displayed selected temperature, a heating element in the space, means for generating a reference voltage, means for generating a ramp voltage, means for combining the bridge output with the ramp voltage and for comparing the combined voltage with the reference voltage to produce a control signal in which the ON time is proportioned in accordance with the bridge output, and means for coupling the control signal to the heating element for correctively energizing the heating element for maintenance of the temperature at the selected value.

6. A temperature controller for use with an electrical heater for controlling the temperature within a system comprising in combination, a resistive bridge having four arms defining pairs of input and output terminals, the first and second arms having first and second resistors having a predetermined ratio, the third arm being a sensing arm, the fourth arm being a setting arm, a source of d.c. power coupled across the input terminals, an operational amplifier having its input coupled across the bridge output terminals for providing an output signal dependent upon the relative resistance between the sensing and setting arms, a source of a.c. power, a power switch for coupling the a.c. power source to the heater, means for coupling the operational amplifier output signal to the power switch so as to apply a.c. power to the heater when the resistance of the setting arm proportionately exceeds the resistance of the sensing arm, the sensing arm of the bridge including a temperature sensitive resistor disposed within the system for measuring the temperature within the system, the temperature sensitive resistor having a resistance which varies directly as a function of temperature with the rate of variation decreasing with increasing temperature, the setting arm including an adjustable setting resistor, a fixed shunt resistor in parallel with the setting resistor, a fixed series resistor interposed in series with the paralleled setting resistor and shunt resistor, the adjustable setting resistor being in the form of a linearly tapped decade resistor in which the taps are settable by a bank of display type thumbwheel switches providing a display linearly graduated in units of temperature, the setting arm thereby provided with a resistance which varies directly as a function of displayed temperature with the rate of variation decreasing with increasing displayed temperature, the value of the series resistor selected to balance the bridge at a minimum temperature, the value of the shunt resistor selected to balance the bridge at a maximum temperature and at an intermediate temperature, whereby the bridge is compensated for the non-linearity of the sensing resistor causing selective application of a.c. power to the heater to accurately maintain the temperature of the system at the displayed temperature.

7. The combination as claimed in claim 6 wherein the means for coupling the operational amplifier to the power switch includes a zero voltage switch for closing the power switch only when the instantaneous value of a.c. voltage in near zero volts.

8. The combination as claimed in claim 7 further including means for generating a reference voltage, means for generating a ramp voltage, and means for combining the ramp voltage with the output signal of the operational amplifier and for comparing the combined voltage with the reference voltage to produce a control signal in which the ON time is proportioned in accordance with the degree of bridge imbalance.

9. The combination as claimed in claim 8 wherein the means for coupling the output signal from the operational amplifier to the power switch further includes optical coupling means for electrically isolating the resistive bridge from the power switch.

10. A temperature controller for use with an electrical heater for maintaining the temperature within a system at a selected set point between minimum and maximum temperatures $T_{min}$ and $T_{max}$ comprising in combination, a bridge having four resistive arms defining pairs of input and output terminals, the first and second arm having first and second resistors for establishing a bridge constant N, the third arm including a temperature sensitive resistor with a temperature coefficient of resistance which gradually varies with increasing temperature to produce inherently non-linear response, the resistance of the temperature sensitive resistor being $R_{min}$ at $T_{min}$, $R_{max}$ at $T_{max}$ and $R_c$ at an intermediate temperature $T_c$, the fourth arm including an adjustable setting resistor, a fixed shunt resistor in parallel with the setting resistor, a fixed series resistor, a fixed series resistor interposed in series with the paralleled setting resistor and shunt resistor, the adjustable setting resistor being in the form of a linearly tapped decade resistor in which the taps are settable by a bank of display type thumbwheel switches providing a display linearly graduated in units of temperature, the value of the series resistor selected as $NR_{min}$, the value of the shunt resistor selected so that the resistance of the setting arm is $NR_{max}$ when the adjustable resistor is set at $T_{max}$ and $NR_c$ when the adjustable resistor is set at $T_c$, and control circuitry connected to the output terminals of the bridge for selectively energizing the heater for maintenance of the temperature at the set point value.

11. A temperature controller for use with an electrical heater for maintaining an actual temperature $T_a$ within a system at a selected set point temperature $T_{sp}$ and operational between temperatures $T_{min}$ and $T_{max}$, comprising in combination, a bridge having four resistive arms defining pairs of input and output terminals, first and second adjacent arms having first and second fixed resistors for establishing a bridge constant N, a sensing arm including a temperature sensitive resistor disposed within the system and having a resistance responsive to $T_a$, a setting arm for establishing $T_{sp}$ and including an adjustable setting resistor, a fixed shunt resistor in parallel with the setting resistor, and a series resistor interposed in series with the paralleled setting resistor and shunt resistor, and control circuitry coupled to the output terminals of the bridge for controlling a supply of power to the electrical heater, the temperature sensitive resistor having a non-linear resistance-temperature relationship characterized by the expression $$R(T_a) = R_0(1 + AT_a + BT_a^2)$$

where R is the resistance as a function of temperature $T_a$, $R_0$ is the resistance at $T_a = 0°C$, A is a constant greater than 0 and B is a constant less than 0, the adjustable resistor being in the form of a linearly tapped decade resistor variable in resistance between 0 and $R_1$, the taps of the adjustable resistor settable by a bank of display type thumbwheel switches providing a display linearly graduated in units of temperature, the series resistor having a value of $R_{series}$ selected as $NR_{min}$ where $R_{min}$ is the resistance of the temperature sensitive resistor at $T_{min}$, the value of the shunt resistor selected as $KR_1$ where $K$ is a constant determined by $$K = X_c - \frac{A+B(T_{max.} - T_{min.}) + 2BT_{min.}}{B(T_{max.} - T_{min.})}$$

where $X$ is a variable of temperature $T$ defined by $$X = \frac{T - T_{min}}{T_{max} - T_{min}}$$

where $T$ may be taken as either $T_a$ or $T_{sp}$, and $X_c$ is a particular value of $X$ corresponding to temperature $T_c$ selected between $T_{min}$ and $T_{max}$ where $T_c=T_a=T_{sp}$, whereby the resistance-set point temperature characteristic of the setting arm is made non-linear making the expression $$NR_0(1+AT_a+BT_a^2) = R_{series} + \frac{(KX)}{(K+X)}R_1$$

exactly valid at temperatures $T_{min}$, $T_c$ and $T_{max}$ and valid with only minimal error at all other temperatures between $T_{min}$ and $T_{max}$ so that the heater is energized when $T_a$ is less than $T_{sp}$.

12. The combination as claimed in claim 11 wherein $R_0$ equals approximately 100, $A$ equals approximately $3.9078 \times 10^{-3}$ and $B$ equals approximately $-0.578 \times 10^{-6}$.

* * * * *

UNITED STATES PATENT AND TRADEMARK OFFICE
CERTIFICATE OF CORRECTION

PATENT NO. : 3,946,200
DATED : March 23, 1976
INVENTOR(S) : Peter Juodikis

It is certified that error appears in the above-identified patent and that said Letters Patent are hereby corrected as shown below:

Column 3, at the end of line 9 and the beginning of line 10, "compounds" should be --components--;

Column 4, lines 1-3, the Equation:

"$M(X) = R_o[A(T_{max.} - T_{min.})X + B(T^{2d\ max.} - T^2_{min.})X^2 - 2B(T^2_{min.} - T_{max.}T_{min.})X]$"

should be --

$M(X) = R_0[A(T_{max.} - T_{min.})X + B(T^2_{max.} - T^2_{min.})X^2 - 2B(T^2_{min.} - T_{max.}T_{min.})X]$ --;

Column 5, line 15, the Equation:

"$NR_o(1 + AT_a + BT_a^2) = R_{series} + \frac{KX}{K+X} R_1$"

should be --$NR_o(1 + AT_a + BT_a^2) = R_{series} + (\frac{KX}{K+X}) R_1$ --;

Column 6, at the beginning of line 49, "bridge balance" should be --"bridge balance"--; on line 53, "bridge balance" should be --"bridge balance"--;

Column 7, line 3, "bridge balance" should be --"bridge balance"--;

UNITED STATES PATENT AND TRADEMARK OFFICE
CERTIFICATE OF CORRECTION

PATENT NO. : 3,946,200
DATED : March 23, 1976
INVENTOR(S) : Peter Juodikis

It is certified that error appears in the above-identified patent and that said Letters Patent are hereby corrected as shown below:

Column 8, at the beginning of line 16, "condition" should be --conduction--;

Column 13, claim 10, at the end of line 30, delete "a fixed series resistor,";

Column 14, claim 11, lines 26-29, the Equation:

$$"K = X_c - \frac{A+B(T_{max.} - T_{min.}) + 2BT_{min.}}{B(T_{max.} - T_{min.})}"$$

should be --

$$K = - X_c - \frac{A+B(T_{max.} - T_{min.}) + 2BT_{min.}}{B(T_{max.} - T_{min.})}$$

--.

Signed and Sealed this twenty-ninth Day of June 1976

[SEAL]

Attest:

RUTH C. MASON
*Attesting Officer*

C. MARSHALL DANN
*Commissioner of Patents and Trademarks*